(12) United States Patent
Kaneko

(10) Patent No.: US 8,514,420 B2
(45) Date of Patent: Aug. 20, 2013

(54) IMAGE FORMING APPARATUS AND METHOD OF USER AUTHENTICATION

(75) Inventor: Takayuki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 12/423,936

(22) Filed: Apr. 15, 2009

(65) Prior Publication Data

US 2009/0268227 A1 Oct. 29, 2009

(30) Foreign Application Priority Data

Apr. 25, 2008 (JP) .................................. 2008-116009

(51) Int. Cl.
*G06K 15/00* (2006.01)

(52) U.S. Cl.
USPC ......................................... 358/1.14; 358/1.15

(58) Field of Classification Search
USPC ............................. 358/1.14; 726/2; 713/165
See application file for complete search history.

(56) References Cited

U.S. PATENT DOCUMENTS

| 5,940,583 A | 8/1999 | Taira et al. |
| 6,014,459 A | 1/2000 | Taira et al. |
| 2002/0120858 A1* | 8/2002 | Porter et al. ................. 713/200 |
| 2005/0102508 A1* | 5/2005 | Kim ............................... 713/165 |
| 2007/0214494 A1* | 9/2007 | Uruta et al. ....................... 726/2 |
| 2009/0228705 A1* | 9/2009 | Cho et al. ....................... 713/158 |

FOREIGN PATENT DOCUMENTS

| JP | 2007-233825 A | 9/2007 |
| JP | 2007-237685 | 9/2007 |
| JP | 2007237685 A * | 9/2007 |

OTHER PUBLICATIONS

Japanese Office Action, dated Jul. 10, 2012, issued by the Japanese Patent Office, in Japanese Patent Application No. 2008-116009.

\* cited by examiner

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

An image forming apparatus includes a user authentication function that authorizes a user to operate saved print data with a password without requiring an input of the password while ensuring a security level. When a user is going to operate a document by using the image forming apparatus, and if the user logged in the image forming apparatus is a creator of the document, the image forming apparatus performs control not requiring the user to input an operation password for print data. Moreover, by managing information on users who have unlocked the operation password as document information, the image forming apparatus also performs control not requiring even users other than the creator of the document to input the operation password if the users have unlocked the operation password ever before.

9 Claims, 19 Drawing Sheets

```
1400
┌─────────────────────────────────────────────────────┐
│  DOCUMENT INFORMATION                                │
│                         1401                         │
│  DOCUMENT CREATOR : KANEKO                           │
│                                       1402           │
│  PASSWORD FOR OPENING DOCUMENT : 12345678            │
│                                              1403    │
│     NUMBER OF USERS WHO HAVE UNLOCKED PASSWORD : 2   │
│        USER 1 : KITANI ── 1404                       │
│        USER 2 : INOUE ── 1405                        │
│  AUTHORITY PASSWORD : ABCDEFGH ── 1406               │
│                                             1407     │
│     NUMBER OF USERS WHO HAVE UNLOCKED PASSWORD : 1   │
│        USER 1 : KITANI ── 1408                       │
│                                           1409       │
│  PASSWORD FOR OPENING ATTACHED FILE : 1234EFGH       │
│                                               1410   │
│     NUMBER OF USERS WHO HAVE UNLOCKED PASSWORD : 0   │
└─────────────────────────────────────────────────────┘
```

1400

DOCUMENT INFORMATION

DOCUMENT CREATOR : KANEKO ~1401

PASSWORD FOR OPENING DOCUMENT : 12345678 ~1402

NUMBER OF USERS WHO HAVE UNLOCKED PASSWORD : 2 ~1403

USER 1 : KITANI ~1404

USER 2 : INOUE ~1405

AUTHORITY PASSWORD : ABCDEFGH ~1406

NUMBER OF USERS WHO HAVE UNLOCKED PASSWORD : 1 ~1407

USER 1 : KITANI ~1408

PASSWORD FOR OPENING ATTACHED FILE : 1234EFGH ~1409

NUMBER OF USERS WHO HAVE UNLOCKED PASSWORD : 0 ~1410

FIG.14

IMAGE FORMING APPARATUS AND METHOD OF USER AUTHENTICATION

BACKGROUND OF THE INVENTION

1. Field of the Invention

The present invention relates to an image forming apparatus provided with a user authentication function for controlling approval and disapproval of performing an operation on print data.

2. Description of the Related Art

When document data is transmitted from a personal computer (PC) to an image forming apparatus and then is printed, the document data is transformed into a page description language (PDL) document with a desired print layout by use of a printer driver installed in the PC; and then the created PDL document is transmitted to and printed by the image forming apparatus. Meanwhile, there is also an image forming apparatus configured to receive document data in the portable document format (PDF) and the like that are widely used in the PC environment; then to convert the received document data into a printable format; and to execute a printing process. Further, there is also an image forming apparatus configured to convert document data received from a PC into a printable format; to temporarily store the converted document data in an auxiliary storage device inside the image forming device; and to render the data printable at a desired timing.

Some document data can accept various password settings. For example, a PDF document can accept a password setting such as a "password for opening a document," an "authority password" or a "password for opening an attached file." If the "password for opening a document" is set to request a user to input the password before opening the PDF document, only a user authorized in advance is allowed to open the file, and thus access to the document for preview is controlled. Meanwhile, if the "authority password" is set, access to the document for printing and editing is controlled. Further, if the "password for opening an attached file" is set, access to the file attached to the document is controlled.

Upon receipt of the document data provided with such access control (password-protected document data) from the PC, the image forming apparatus converts the document data into the printable format and saves the document data in its storage device as password-protected print data. When a user wishes to access the saved print data, the image forming apparatus requests the user to input the password. However, if a user is requested to input a password in every operation using a touch panel or various buttons on the image forming apparatus, the user is annoyed by such password input. To address this problem, Japanese Patent Laid-Open No. 2007-237685 discloses an image forming apparatus which functions in collaboration with an authentication system, and allows users to access print data without requesting password inputs. In this image forming apparatus, a "document creator" and "accessible users and their authorities" for a document are managed as document information that is associated with print data. Thereby, when a user of the image forming apparatus is either the "document creator" or the "accessible user," the user is allowed to access the print data without inputting the password.

The apparatus according to Japanese Patent Laid-Open No. 2007-237685 allows users authorized in advance (either as the "document creator" or the "accessible user") to access the print data without inputting the password even in the case where the print data is password-protected print data. However, a user who knows the password but is not authorized in advance has to input the password every time the user wishes to access the print data. Moreover, the apparatus according to Japanese Patent Laid-Open No. 2007-237685 unconditionally allows the users once authorized in advance to access print data even after the password for the print data is changed. Therefore, this apparatus has a problem that its security level is low.

SUMMARY OF THE INVENTION

An image forming apparatus according to the present invention includes: unit for receiving document data set with an operation password; unit for converting the document data into print data; unit for generating document information including the operation password and user information of a user authorized to perform an operation of the print data; unit for setting the document information into the print data; unit for storing the print data set with the document data; and unit for determining whether or not to authorize a login user to operate the print data stored in the unit for storing by referring to the document information set in the printed data. Here, the unit for determining authorizes the login user to operate the print data stored in the unit for storing when user information of the login user matches the user information included in the document information. Moreover, the unit for determining requests the login user to input the operation password when the user information of the login user does not match the user information included in the document information. Further, the unit for determining authorizes the login user to operate the print data stored in the unit for storing and adds the user information of the login user to the document information when the operation password is inputted by the login user.

A method of user authentication according to the present invention includes the steps of: receiving document data set with an operation password; converting the document data into print data; generating document information including the operation password and user information of a user authorized to perform an operation of the print data; setting the document information into the print data; storing the print data set with the document data; and determining whether or not to authorize a login user to operate the print data stored in the step of storing by referring to the document information set in the printed data. Here, in the step of determining, the login user is authorized to operate the print data stored in the step of storing when user information of the login user matches user information included in the document information. Moreover, in the step of determining, the login user is requested to input the operation password when the user information of the login user does not match the user information included in the document information. Further, in the step of determining, the login user is authorized to operate the print data stored in the step of storing, and the user information of the login user is added to the document information when the operation password is inputted by the login user.

The present invention allows not only the document creator but also a user who has accessed the print data ever before by using the password to access the print data again without receiving the user authentication by inputting the password. Moreover, when the password is changed, the access to the print data can be controlled so that only the users who know the changed password can be authorized to access the print data. In this way, according to the present invention, an image forming apparatus which is highly convenient for users can be provided without degrading a security level.

Further features of the present invention will become apparent from the following description of exemplary embodiments (with reference to the attached drawings).

BRIEF DESCRIPTION OF THE DRAWINGS

FIG. 14 is a view showing an example of document information;

FIG. 16 is a diagram showing the relationship of FIGS. 16A, 16B and 16C;

DESCRIPTION OF THE EMBODIMENTS

Now, an embodiment of the present invention will be described below in detail with reference to the accompanying drawings.

Figure 1:
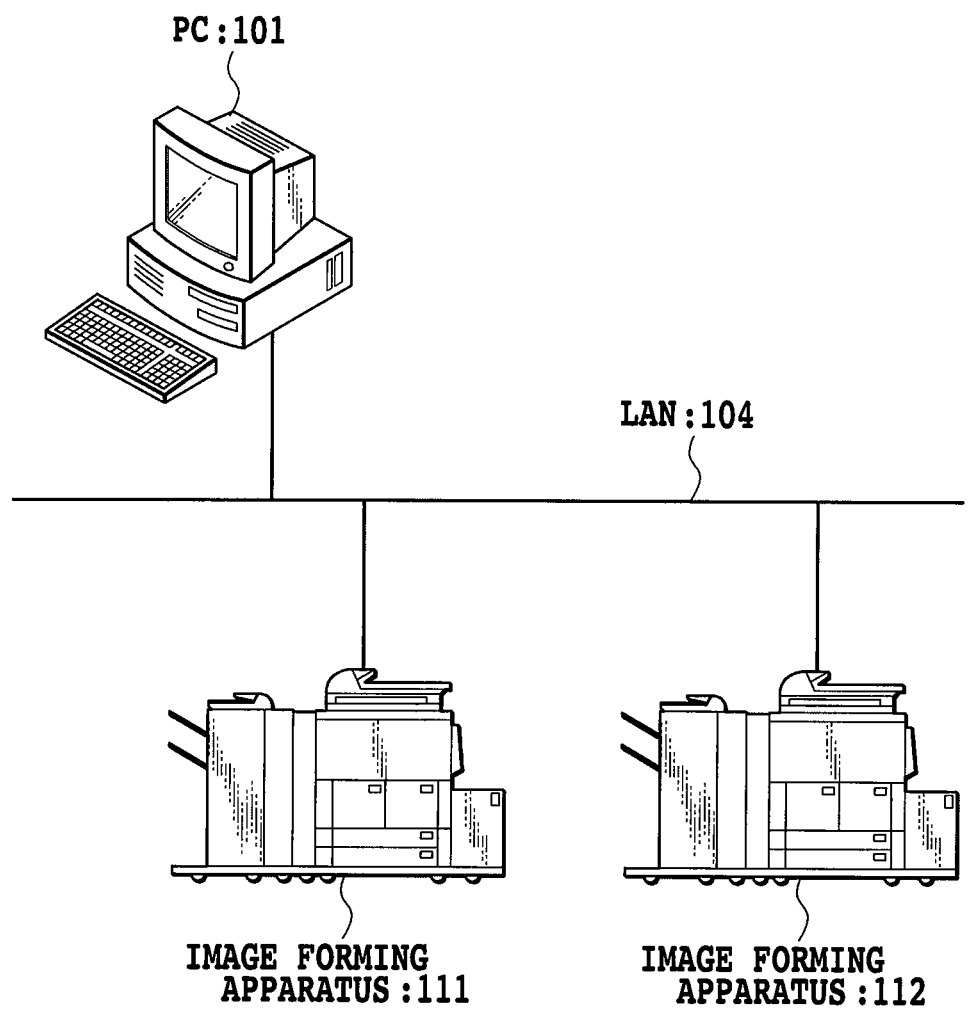
FIG. 1 is a view showing a configuration example of a system to which the present invention can be applied.

FIG. 1 is a view showing a configuration example of a system to which the present invention can be applied.

This system includes a personal computer (PC) 101, image forming apparatuses 111 and 112 and a local area network (LAN) configured to connect the PC 101 to the image forming apparatuses 111 and 112. Although FIG. 1 illustrates an example where there are two image forming apparatuses, the image forming apparatus may be one. Now the following embodiment will describe a case of printing by using the image forming apparatus 111.

In this embodiment the PC 101 and the image forming apparatuses 111 and 112 are connected to one another through the network. Instead, it is also possible to apply a different mode of connection by way of parallel cables, serial cables, universal serial bus (USB) cables or the like. Meanwhile, the mode of network connection is not limited to the LAN, and the Internet is also applicable thereto.

Figure 2:
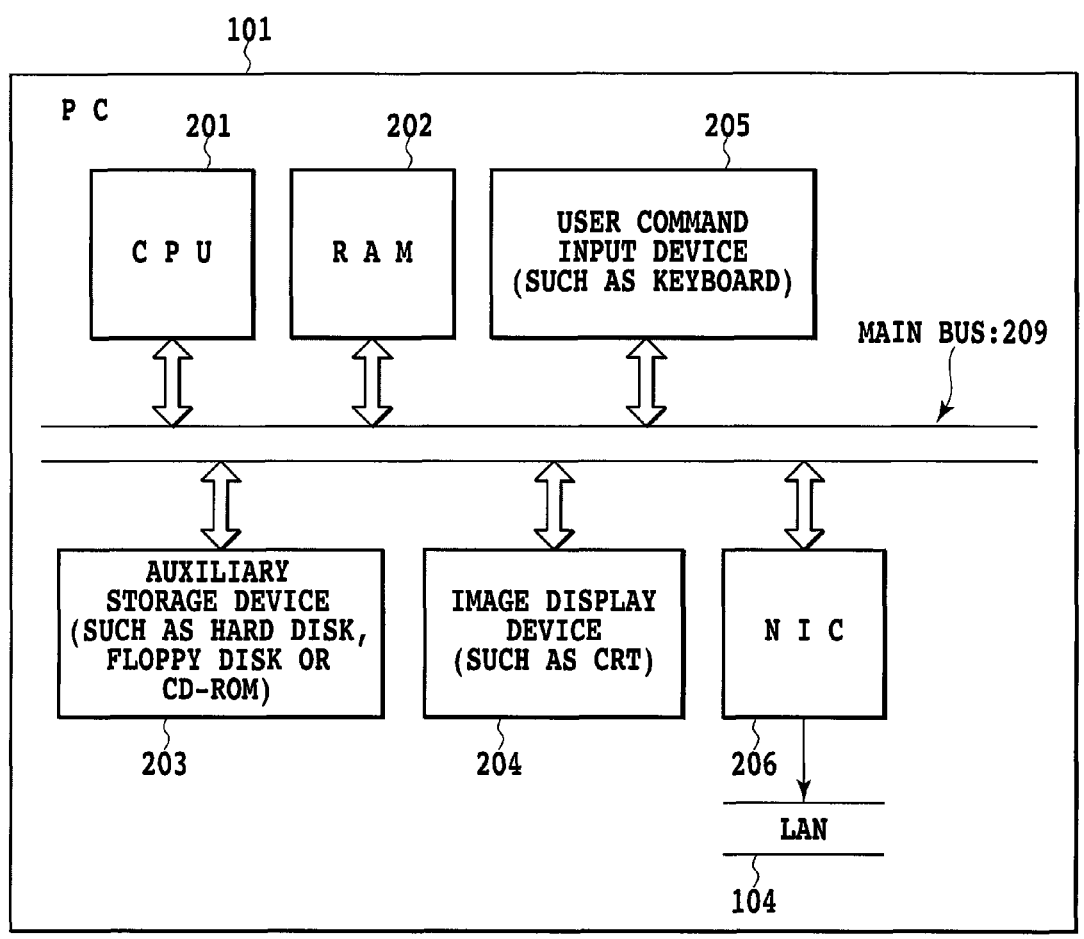
FIG. 2 is a block diagram showing a configuration example of a personal computer (PC) 101.

FIG. 2 is a block diagram showing a configuration example of the PC 101.

The PC 101 includes a central processing unit (CPU) 201, a random access memory (RAM) 202, an auxiliary storage device 203, an image display device 204, a user command input device 205, a network interface card 206, and a main bus 209. The auxiliary storage device 203 is a hard disk, a Floppy (registered trademark) disk or a compact disc read-only memory (CD-ROM), for example. The image display device 204 is a cathode-ray tube (CRT) display or a liquid crystal display, for example. The image display device 204 notifies a user of messages and the like. The user command input device 205 is a mouse or a keyboard, for example. The user command input device 205 receives command inputs from the user. The network interface card 206 exchanges data to and from other network appliances through a LAN 220.

Figure 3:
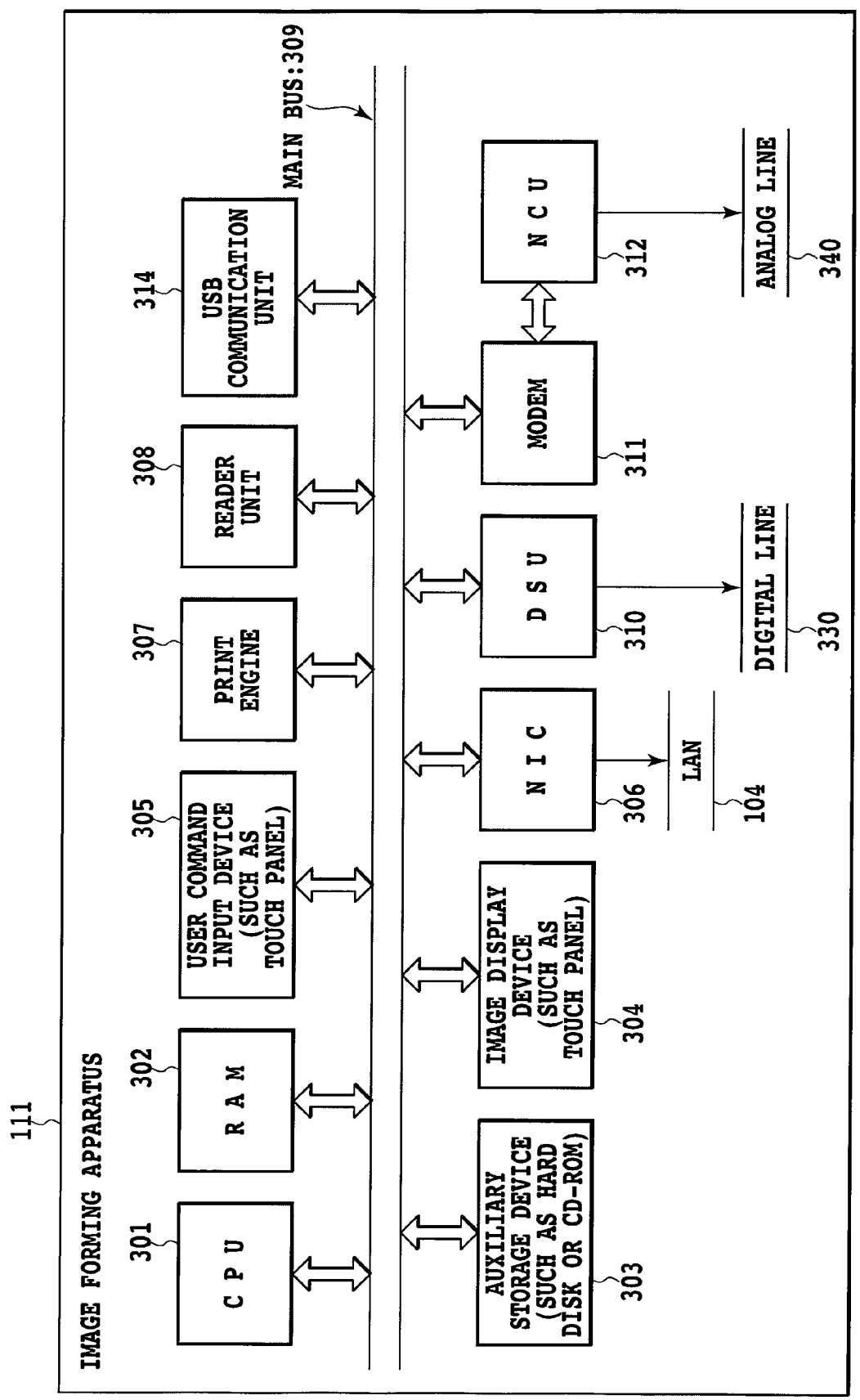
FIG. 3 is a block diagram showing a configuration example of an image forming apparatus 111.

FIG. 3 is a block diagram showing a configuration example of the image forming apparatus 111.

A CPU 301 interprets a printing job received from the PC 101, and performs print control and the like. An auxiliary storage device 303 is a hard disk or a CD-ROM, for example. An image display device 304 is a touch panel, for example. The image display device 304 displays a status of the image forming apparatus 111 and various messages. A user command input device 305 is a touch panel, for example. A user (a login user) logs into the image forming apparatus 111 and instructs the printing job by operating the user command input device 305. Here, the image display device 304 and the user command input device 305 may be formed of a single touch panel.

A print engine 307 performs print control based on the printing job received from the PC 101. A reader unit 308 reads manuscript placed on a platen, and generates electronic data such as black-and-white binary data and color multi-value data. A digital service unit (DSU) 310 performs data transmission and reception with other devices through a digital line 330. A network control unit (NCU) 312 performs data transmission and reception with other devices through an analog line 340. A modem 311 performs modulation and demodulation of the transmitted and received data. A USB communication unit 314 performs data transmission and reception with other information terminals by using USB.

It is to be noted that the reader unit 308, the DSU 310, the modem 311, the NCU 312, the digital line 330, and the analog line 340 are not necessary in this embodiment.

Figure 4:
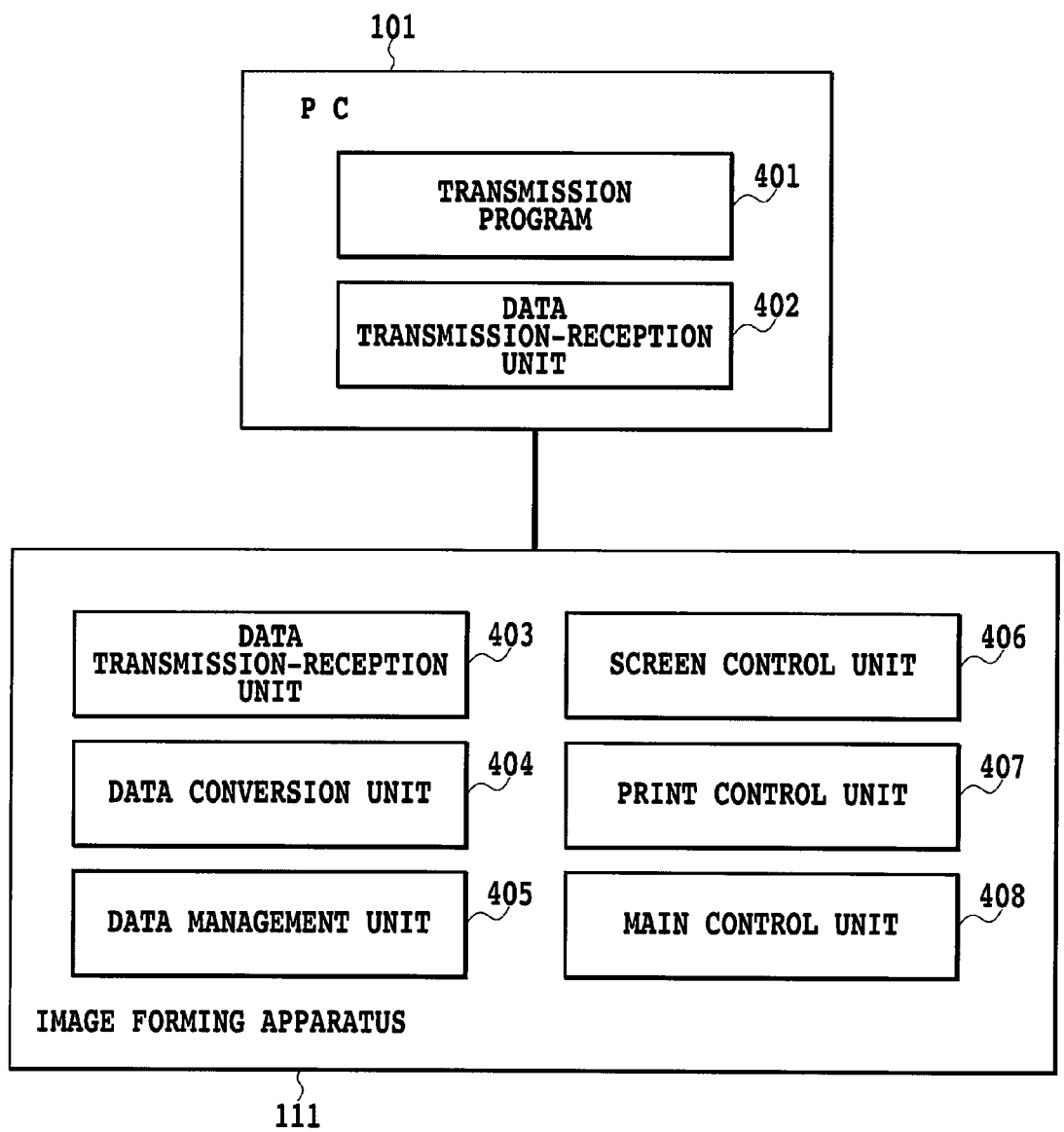
FIG. 4 is a block diagram schematically showing functions of the PC 101 and the image forming apparatus 111.

FIG. 4 is a block diagram schematically showing functions of the PC 101 and the image forming apparatus 111.

The PC 101 is installed with a transmission program 401 for transmitting document data such as XML paper specification (XPS) data or PDF data to the image forming apparatus 111. The transmission program 401 has a function to transmit the document data to the image forming apparatus 111 through a data transmission-reception unit 402 in accordance with an instruction by a user.

The image forming apparatus 111 includes a data transmission-reception unit 403, a data conversion unit 404, a data management unit 405, a screen control unit 406, a print control unit 407, and a main control unit 408. The main control unit 408 performs overall control of the image forming apparatus 111. The data transmission-reception unit 403 receives the document data from the PC 101 through a network interface card (NIC) 306. The data conversion unit 404 converts the document data received from the PC 101 into a data format that can be processed by the print engine 307 for printing, in accordance with an instruction from the main control unit 408. The print control unit 407 performs print control based on the converted data obtained from the data conversion unit 404, in accordance with an instruction from the main control unit 408. The data management unit 405 saves data in the auxiliary storage device 303 or reads data that are saved in the auxiliary storage device 303 and stores the data in a storage unit such as the RAM 302, in accordance with an instruction from the main control unit 408.

Figure 5:
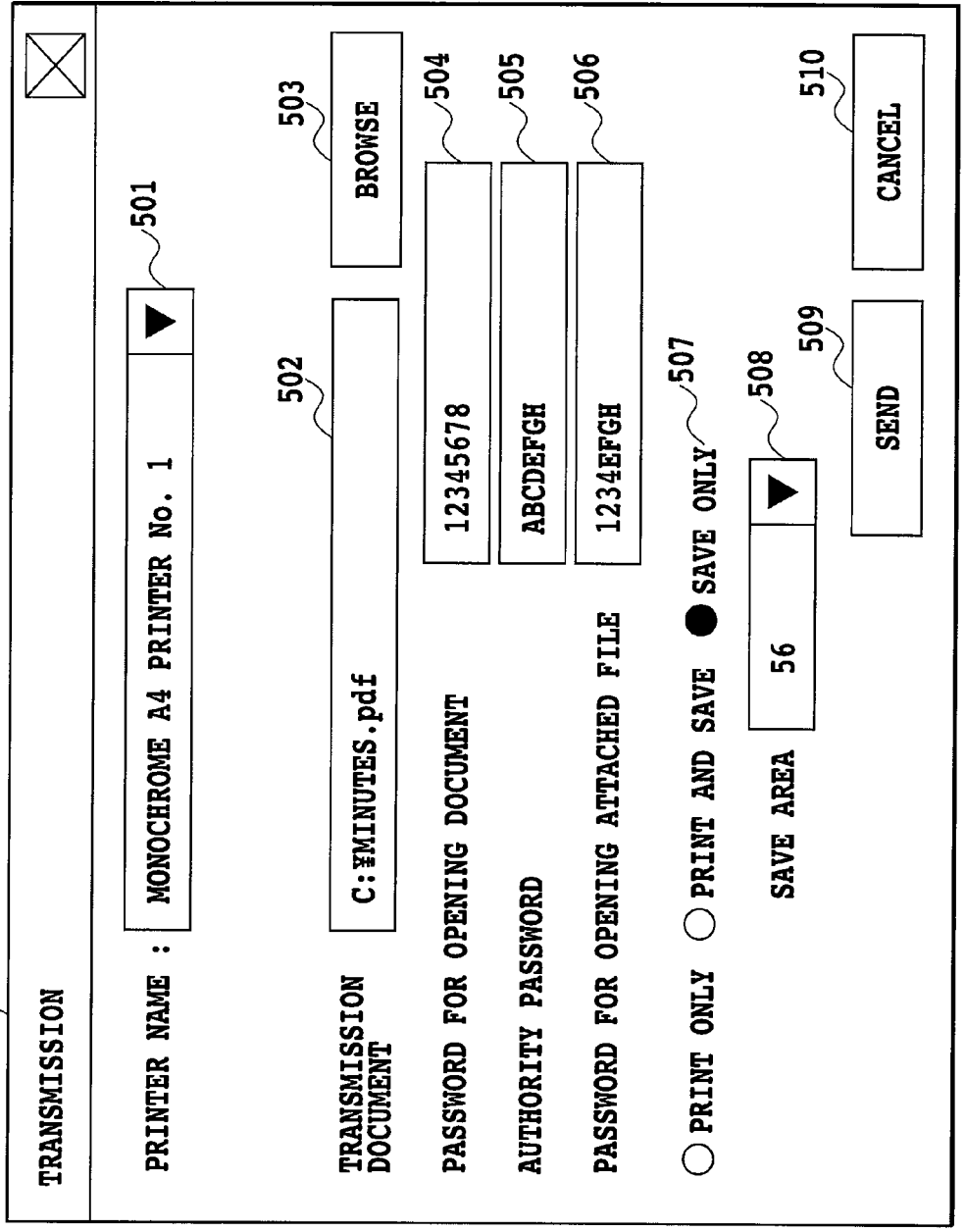
FIG. 5 is a view showing an example of a transmission setting screen displayed on a display of the PC 101 by a transmission program 401 installed in the PC 101.

FIG. 5 is a view showing an example of a transmission setting screen to be displayed on a display of the PC 101 by the transmission program 401 installed in the PC 101.

A transmission setting screen 500 includes a printer designation area 501, a transmission document designation area 502, a transmission document reference area 503, and password designation areas 504, 505, and 506 for designating a document operation password.

The document operation password is any of a "password for opening a document," an "authority password," and a "password for opening an attached file." The "password for opening a document" is a password used for displaying a preview of the print data on the image forming apparatus 111. The "authority password" is a password used for printing the print data or editing the print data (such as deletion or password changing). The "password for opening an attached file" is a password used when separate document data attached to a document file is used (displaying a preview, printing or editing).

The printer designation area 501 is an area for designating the image forming apparatus 111 which is a destination of the document data.

The transmission setting screen 500 further includes a process type designation area 507 for designating a process type to be executed by the image forming apparatus 111 after transmitting the document data, a save area designation area 508 for designating a place to save the document data, a send button 509, and a cancel button 510.

The transmission document reference area 503 is an area used for making reference to a document saved in the auxiliary storage device 203 or the like in the PC 101.

When a field "print only" is designated in the process type designation area 507, the image forming apparatus 111 only prints the print data. When a field "print and save" is designated, the image forming apparatus 111 prints the print data and saves the print data in a save area designated in the save area designation area 508. When a field "save only" is designated, the image forming apparatus 111 saves the print data in a save area designated in the save area designation area 508 without printing the print data.

The save area designation area 508 is an area for designating a save area (100 save areas ranging from 00 to 99, for example) managed by a data management unit 405 in the image forming apparatus 111.

When the user presses the send button 509, the transmission program 401 transmits the document data designated in the transmission document designation area 502 to the image forming apparatus 111 designated in the printer designation area 501 through the data transmission-reception unit 402. Meanwhile, when the user presses the cancel button 510, the transmission program 401 cancels the transmission process.

Figure 6:
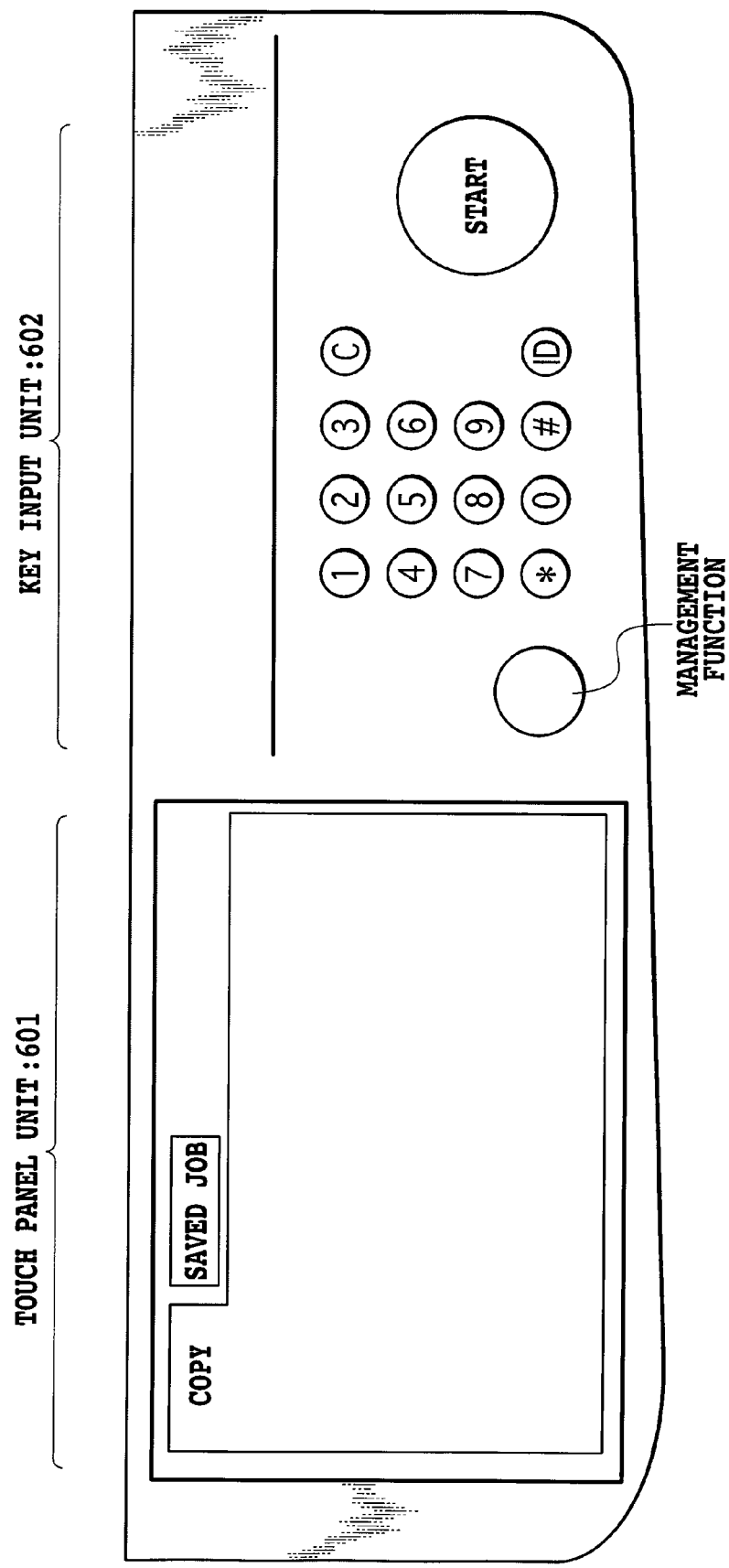
FIG. 6 is a view showing an exterior appearance of a touch panel unit and a key input unit provided on the image forming apparatus 111.

FIG. 6 is a view showing an exterior appearance of a touch panel unit and a key input unit provided on the image forming apparatus 111. The touch panel unit and the key input unit correspond to the screen display device 304 and the user command input device 305 described above.

A touch panel unit 601 displays functions offered by the image forming apparatus 111 in the form of a tab page format, and receives instructions from the user. The key input unit 602 includes keys such as numeric keypad, and receives instructions from the user. The key input unit 602 is used together with the touch panel unit 601.

Figure 7:
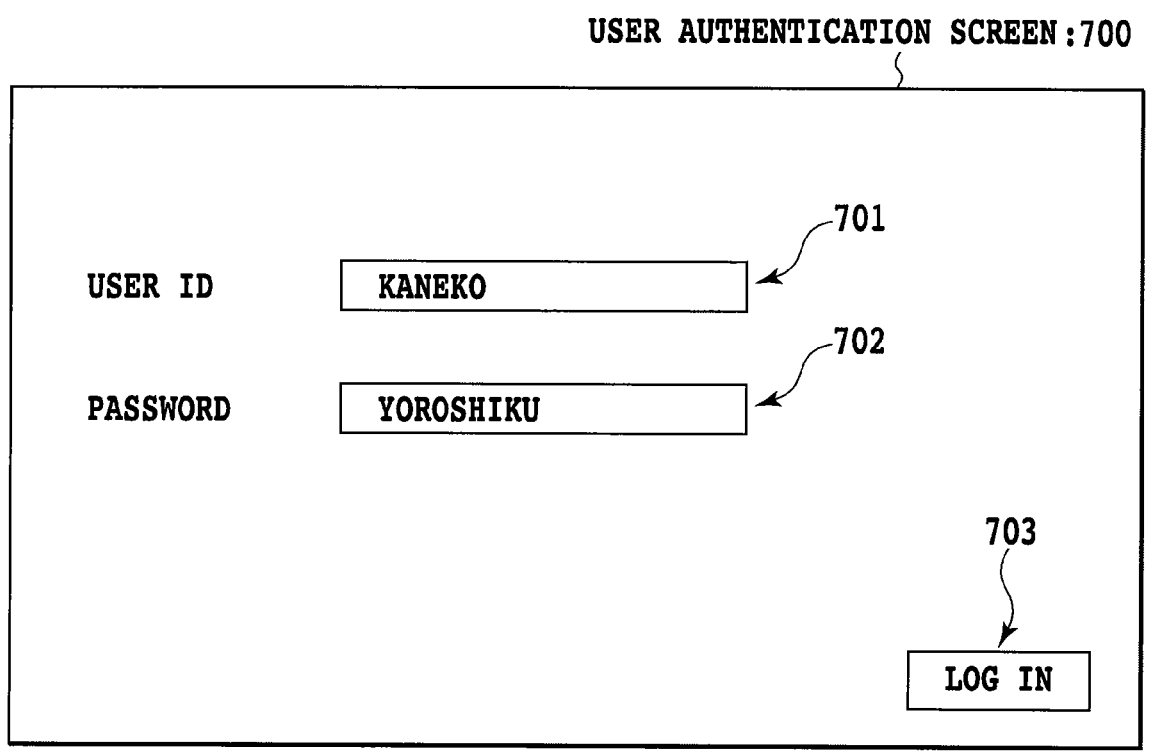
FIG. 7 is a view showing an example of a user authentication screen displayed on the touch panel unit 601.

FIG. 7 is a view showing an example of a user authentication screen to be displayed on the touch panel unit 601.

A user authentication screen 700 includes a user ID input area 701, a password input area 702, and a login button 703.

User information such as a user identification (ID) or a password which are used for user authentication is managed by the data management unit 405 in the image forming apparatus 111. Instead, the user information may be managed by a user authentication system in which the image forming apparatus 111 and a server (such as a user authentication server) collaborate to perform user authentication.

The login user inputs the user ID and the password in the user ID input area 701 and the password input area 702, respectively, and attempts to log in by pressing the login button 703. The main control unit 408 determines to authorize or not to authorize the login of the login user based on the user ID and the password inputted by the login user.

Figure 8:
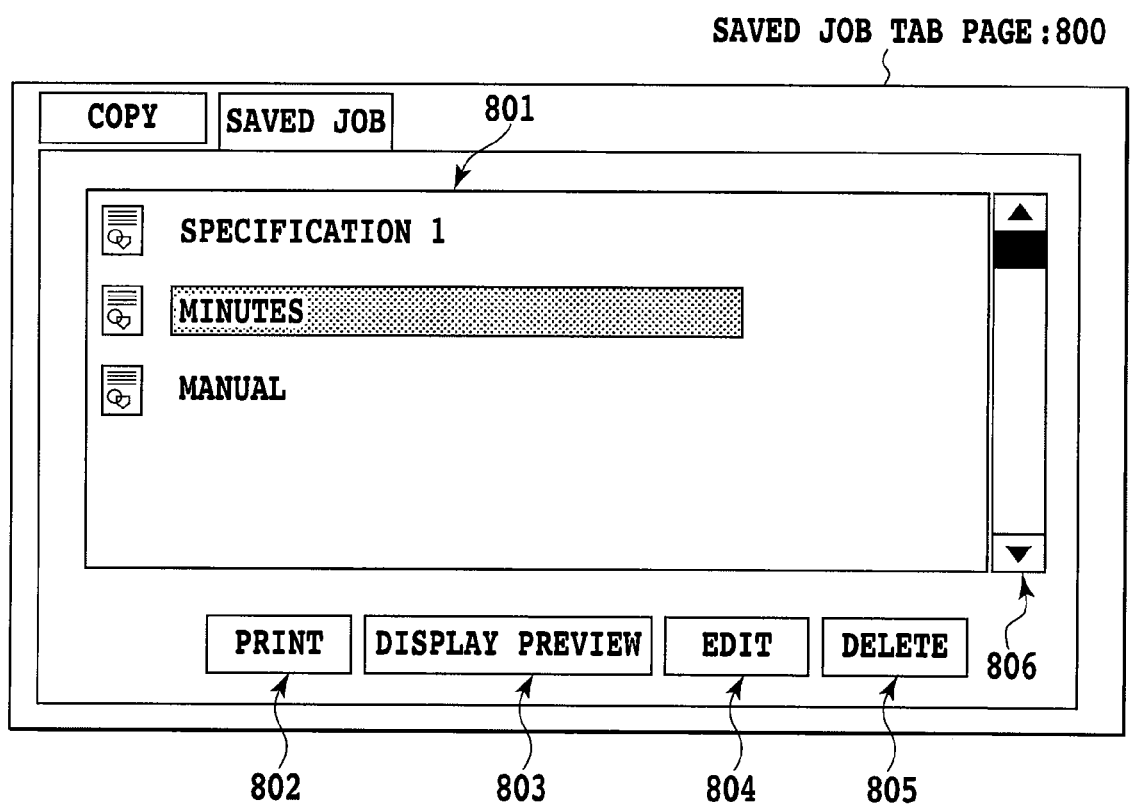
FIG. 8 is a view showing an example of a saved job tab page to be displayed on the touch panel unit 601.

FIG. 8 is a view showing an example of a saved job tab page to be displayed on the touch panel unit 601.

A saved job tab page 800 includes a printing job display area 801, a print button 802, a preview display button 803, an edit button 804, a delete button 805, and a scroll bar 806.

The printing job display area 801 displays a list of printing jobs obtained by means of converting the document data received from the PC 101 into the printable format, i.e. names of the print data. Specifically, the list of print data that is saved in the storage device of the image forming apparatus 111 is displayed in the printing job display area 801. When the login user selects the name of the print data targeted for printing from the names of the print data displayed on the list, a display color of the selected name is changed. In this way, the login user can designate the print data targeted for processing. In the example shown in FIG. 8, the print data having the name "minutes" is designated by the login user.

The print button 802 is a button used for printing the print data designated in the printing job display area 801.

The preview display button 803 is a button used for displaying a preview image of the print data designated in the printing job display area 801.

The edit button 804 is a button used for editing (such as "deletion of a page") the print data designated in the printing job display area 801.

The delete button 805 is a button used for deleting the print data designated in the printing job display area 801.

The scroll bar 806 is a scroll bar for vertically scrolling the list of the print data when there are too many pieces of the print data that cannot be fully displayed in the printing job display area 801.

Figure 9:
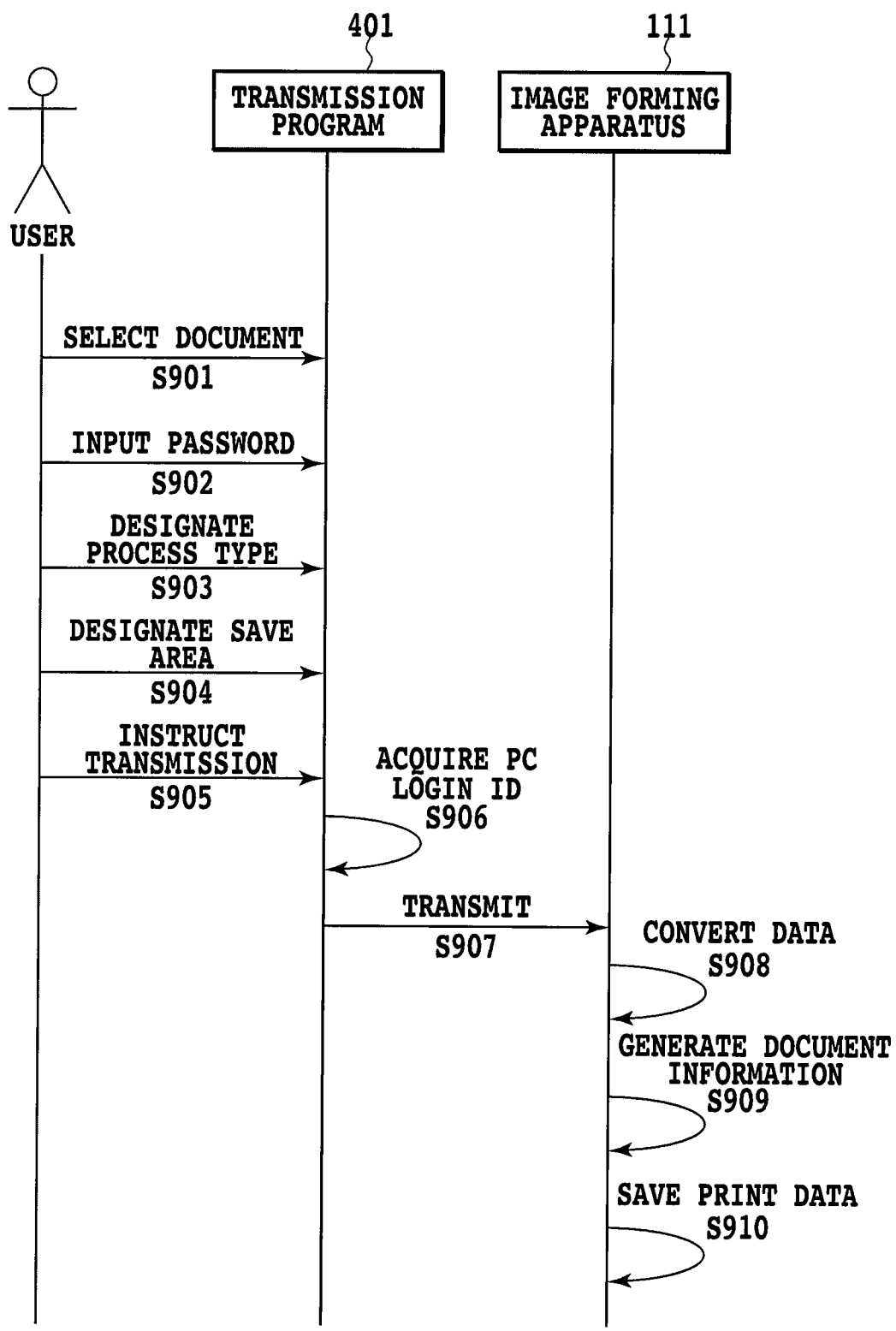
FIG. 9 is a diagram showing a flow of data between the transmission program 401 that is installed in the PC 101 and the image forming apparatus 111.

FIG. 9 is a diagram showing a flow of data between the transmission program 401 installed in the PC 101 and the image forming apparatus 111. Specifically, FIG. 9 shows the flow of transmitting the document data or the like from the PC 101 to the image forming apparatus 111, then converting the document data or the like received by the image forming apparatus 111 into the print data, and then storing the print data in the storage device.

Using the PC 101, the user performs the above-described settings and instructions through the transmission setting screen 500 presented by the transmission program 401. Specifically, the user selects the document to be transmitted in the transmission document designation area 502 (S901) and inputs the document operation passwords in the password designation areas 504, 505, and 506 (S902). Subsequently, the user designates the process type in the process type designation area 507 (S903), then designates the save area of the document data in the save area designation area 508 (S904), and then instructs transmission of the document data by pressing the send button 509 (S905).

When transmission of the document data is instructed, the transmission program 401 acquires a user ID 701 for logging into the PC 101 (S906), and transmits the document data, the document operation passwords, and the user ID to the image forming apparatus 111 (S907).

The image forming apparatus 111 converts the received document data into the printable print data (S908), and generates the document information based on the various passwords and the user ID (S909). The document information includes a document creator, the "password for opening a document," the "authority password," and the "password for opening an attached file." Detail of the document information will be described later.

Subsequently, the image forming apparatus 111 embeds the generated document information in the print data and saves the print data in the auxiliary storage device 303 (S910). Details of the steps S908 to S910 will be described later.

Figure 10:
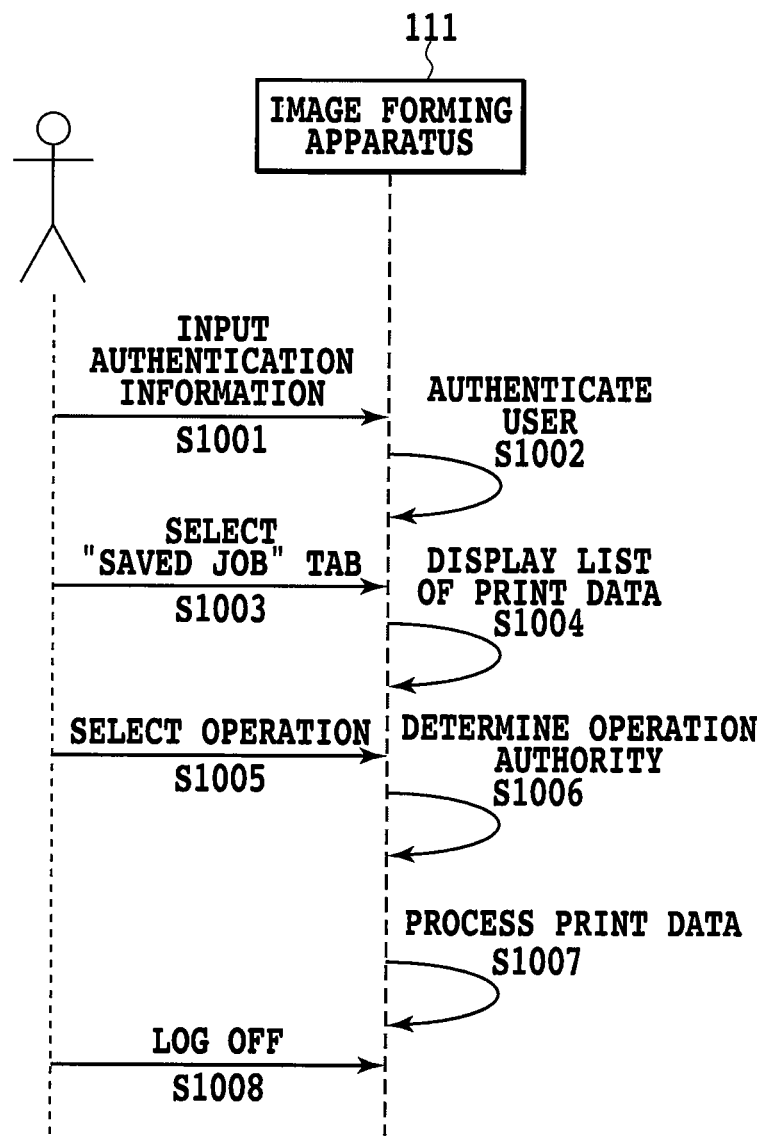
FIG. 10 is a diagram showing a process flow of the image forming apparatus 111 after saving print data.

FIG. 10 is a diagram showing a process flow of the image forming apparatus 111 after saving the print data.

The login user logs into the image forming apparatus 111 by inputting the user ID and the password on the user authentication screen 700, and undergoes user authentication (S1001 and S1002).

Subsequently, when the login user selects the saved job tab on the touch panel unit 601 (S1003), the main control unit 408 displays, onto the saved job tab page 800, the list of the names of the print data saved in the data management unit 405 (S1004). Thereafter, the login user designates the print data targeted for processing on the saved job tab page 800, and selects the operation (such as printing, preview display or editing) to be applied to the print data (S1005). When the operation to be applied to the print data is selected, the main control unit 408 determines whether the login user has the authority for the operation (S1006), and executes the process on the print data in response to the authority for operation (S1007). Details of the steps S1005 to S1007 will be described later. Lastly, the login user logs off from the image forming apparatus 111 (S1008).

Figure 11:
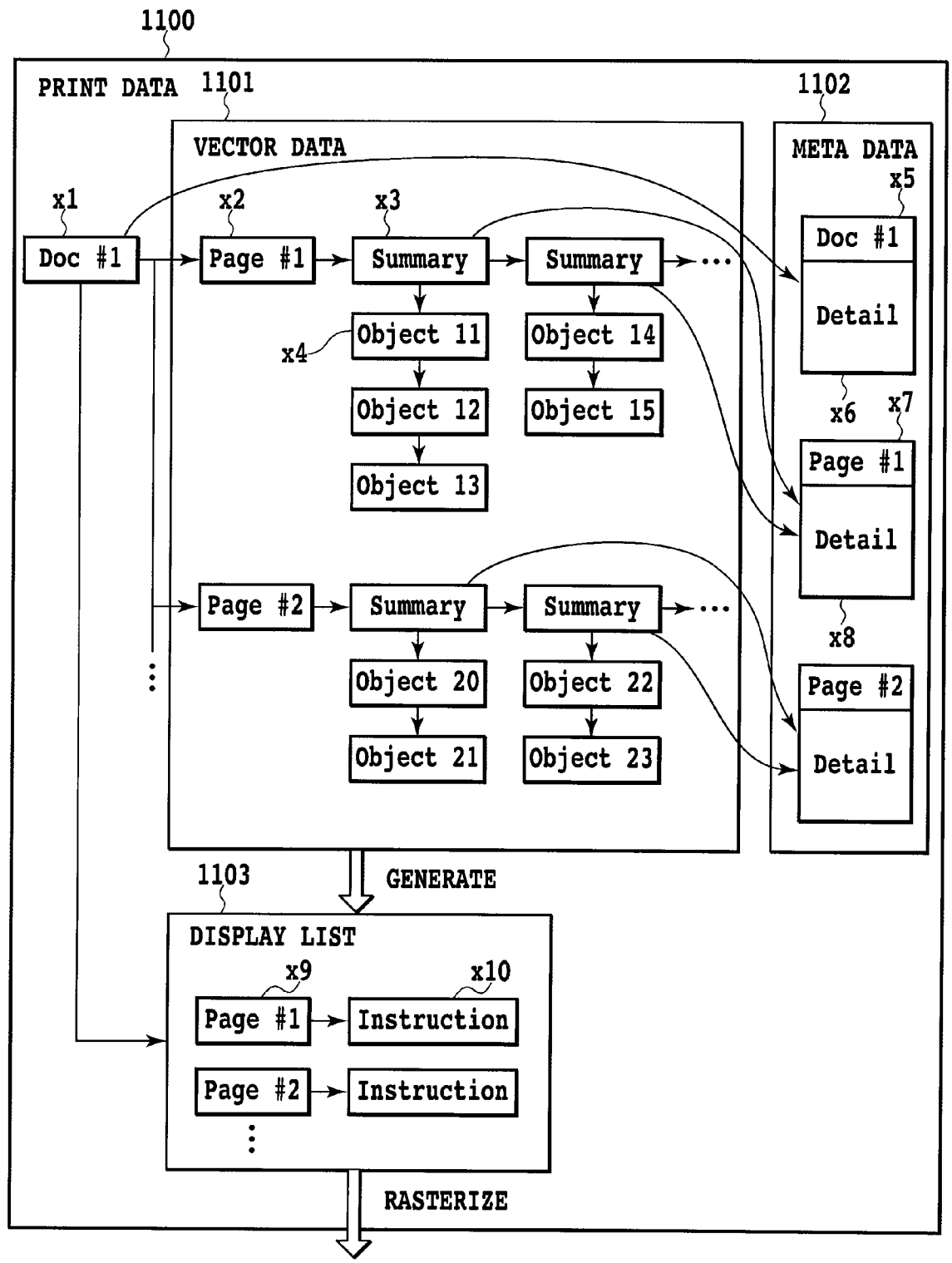
FIG. 11 is a diagram showing an example of a data structure of the print data.

FIG. 11 is a diagram showing an example of a data structure of the print data.

In this embodiment, the print data is assumed to be composed of multiple pages of data. The print data includes vector data 1101, meta data 1102, and a display list 1103. The print data applies a hierarchical structure where a document header (x1) is on the top.

The vector data 1101 is logical drawing data not dependent on resolution. The vector data 1101 includes page headers (x2), summary information (X3), and objects (x4). The meta data 1102 includes document information (x5), document detail information (x6), page information (x7), and page detail information (x8). The display list 1103 includes page headers (x9) and instructions (x10) for drawing data rasterisation A storage location of the vector data (x2) and a storage location of the display list 1103 are described in the document header (x1). That is, the vector data 1101 is linked with the display list 1103 by the document header (x1).

Layout information including the size and orientation of the page is described in each of the page headers (x2). Drawing data for lines, polygons, and Bezier curves is described in each of the objects (x4). The multiple objects (x4) are collectively linked with the summary information (x3). The summary information (x3) expresses a summary of characteristics of the multiple objects. Information constituting the source of image areas is described in the summary information (x3), for example. The objects (x4) also include image objects.

The meta data 1102 is additional information which is not used for a drawing process. In this embodiment, the document creator, the "password for opening a document," the "authority password," the "password for opening an attached file" and the like are stored in the storage area of the document information (x5) in the meta data 1102.

The document detail information (x6) includes document detail information such as a printing style of the entire document. Since the meta data 1102 is associated with the document header (x1), the document detail information (x6) can be referred to from the document header (x1).

The page information (x7) includes information such as whether the meta data is generated from image mode data or generated from a PDL containing character objects, for example. The page detail information (x8) includes attribute information related to security and a character string (a character code string) which is generated as additional information.

Since the meta data 1102 is associated with the summary information (x3) of the vector data 1101, the page detail information (x8) can be referred to from the summary information (x3).

The display list 1103 includes intermediate codes for converting the vector data into the form of dot images. Drawing information such as placement information and layout information for actually printing respective objects (figures, pictures, fonts, and the like) contained in the vector data 1101 onto paper is described in the display list 1103.

In each of the page headers (x9), a management table for the instructions (x10) in the page and the like are described. The instruction (x10) is drawing information dependent on the resolution.

Figure 12:
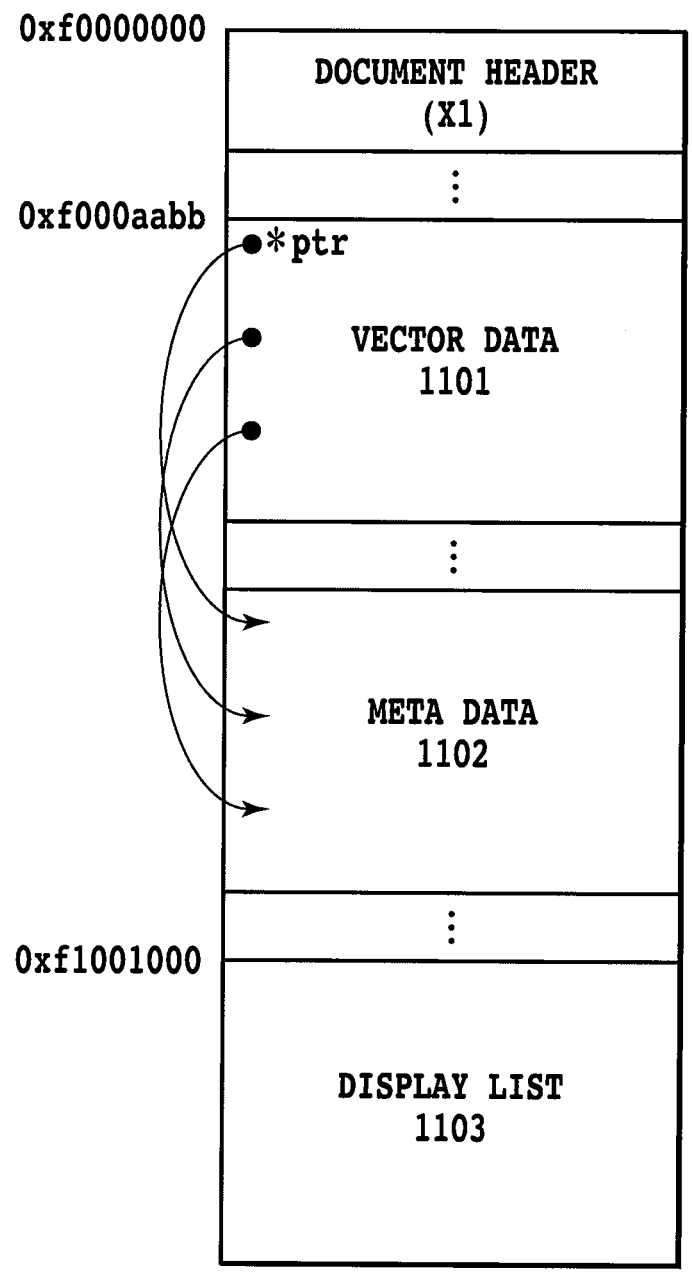
FIG. 12 is a diagram showing a memory area for storing the print data.
Figure 13:
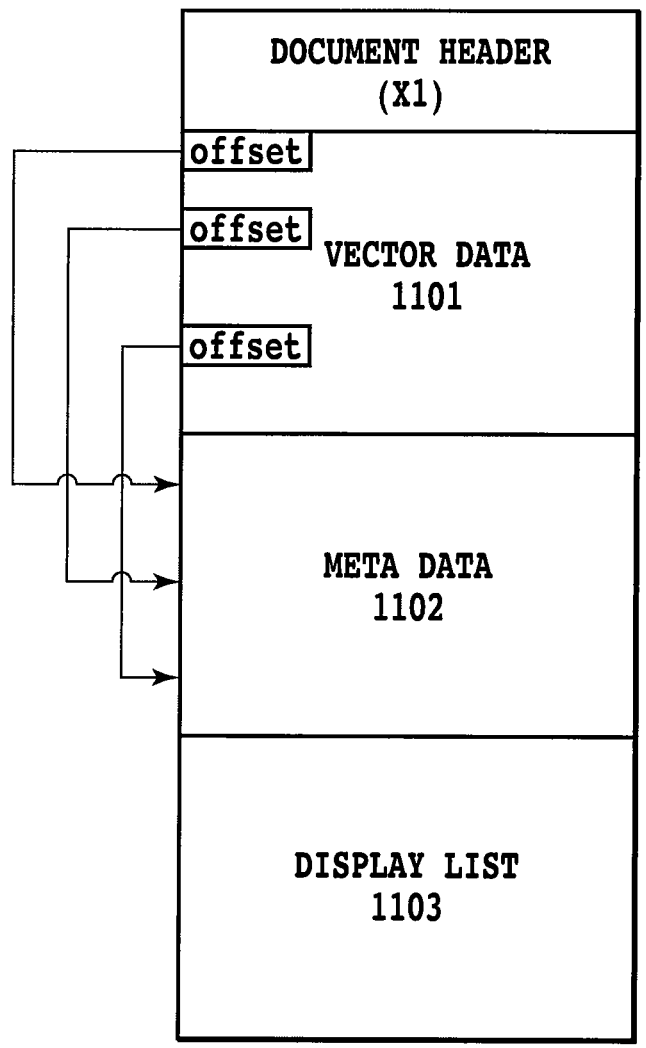
FIG. 13 is a diagram showing a file to be stored in the print data.

FIG. 12 is a diagram showing a memory area for storing the print data illustrated in FIG. 11. The document header (x1), the vector data 1101, the meta data 1102, and the display list 1103 are stored in the memory in accordance with the layout shown in FIG. 12. FIG. 13 is a diagram showing a file stored in the print data illustrated in FIG. 11. As shown in FIG. 13, the print data is stored in a single file.

FIG. 14 is a view showing an example of document information.

Document information 1400 is newly generated in the above-described process in S909 (FIG. 9). The document information can be updated by the main control unit 408 of the image forming apparatus 111 in the processes in S1005 to S1007 (FIG. 10). The updating process of the document information will be described later.

The document information 1400 includes a user ID 1401 of the document creator, the "password for opening a document" 1402, the "authority password" 1406, and the "password for opening an attached file" 1409.

The user ID for logging into the PC 101, which is acquired by the transmission program 401 in the course of the process in S906 (FIG. 9), is set in the user ID 1401 of the document creator. The password inputted to the area 504 on the transmission setting screen 500 (FIG. 5) is set in the "password for opening a document" 1402. The password inputted to the area 505 on the transmission setting screen 500 (FIG. 5) is set in the "authority password" 1406. The password inputted to the area 506 on the transmission setting screen 500 (FIG. 5) is set in the "password for opening an attached file" 1409.

Moreover, for each password, the number of the users who have already unlocked the password and user IDs of those users are also set in the document information 1400. In the document information shown in FIG. 14, two users (1403) have unlocked the "password for opening a document," and the user IDs of those users are "KITANI" 1404 and "INOUE" 1405. Meanwhile, one user (1407) has unlocked the "authority password" and the user ID of the user is "KITANI" 1408. Moreover, there is no user who has unlocked the "password for opening an attached file."

The document information 1400 is the information which can be used for reference or updated at any time.

Figure 15:
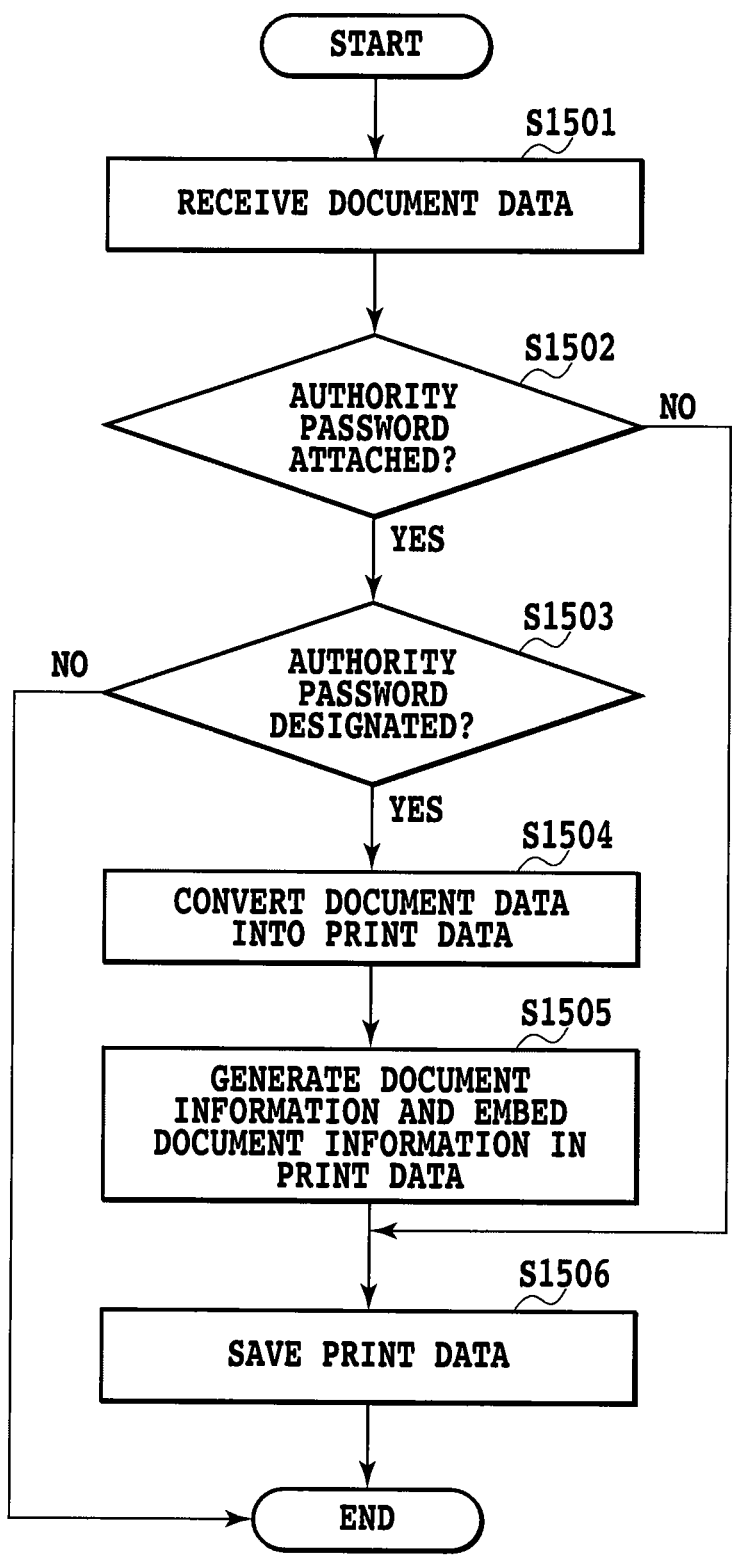
FIG. 15 is a flowchart showing an example of a conversion process of document data into the print data and a saving process for the printing data to be executed by the image forming apparatus 111.

FIG. 15 is a flowchart showing an example of the conversion process of the document data into the print data and the saving process for the printing data (S908 to S910) to be executed by the image forming apparatus 111.

In S1501, the image forming apparatus 111 receives the document data from the PC 101.

In S1502, the image forming apparatus 111 determines whether or not the "authority password" is attached to the document data. When the "authority password" is not attached to the document data, the image forming apparatus 111 converts the document data into the print data, and saves the print data in S1506. As described previously, the "authority password" is the password used for printing the print data or editing (such as deletion or password changing) the print data.

When the "authority password" is attached to the document data, the image forming apparatus 111 determines whether or not the "authority password" is designated for the image forming apparatus 111 by the user in S1503. In this embodiment, the print data to be handled by the image forming apparatus 111 is assumed to be printed out in the end. Accordingly, if the "authority password" necessary for printing is not designated for the image forming apparatus 111, the document data will be processed as invalid data.

When the "authority password" is designated for the image forming apparatus 111, the image forming apparatus 111 converts the document data into the print data in S1504 by using the data conversion unit 404 and using either the designated "authority password" or the "password for opening a document".

In S1505, the image forming apparatus 111 generates the document information 1400 based on the document creator and the document operation passwords received from the PC 101, and stores the document information 1400 in the storage area of the document information (x5).

In S1506, the image forming apparatus 111 saves the print data embedded with the document information in the auxiliary storage device 303 by using the data management unit 405.

After these processes, the operation for saving the print data in the image forming apparatus 111 is completed.

Figure 16A:
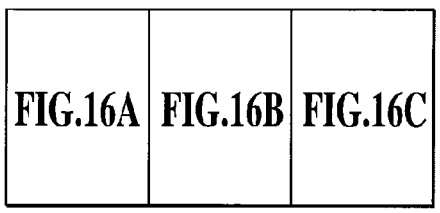
FIG. 16A is a flowchart showing an example of operation for the print data saved in the image forming apparatus 111.
Figure 16A:
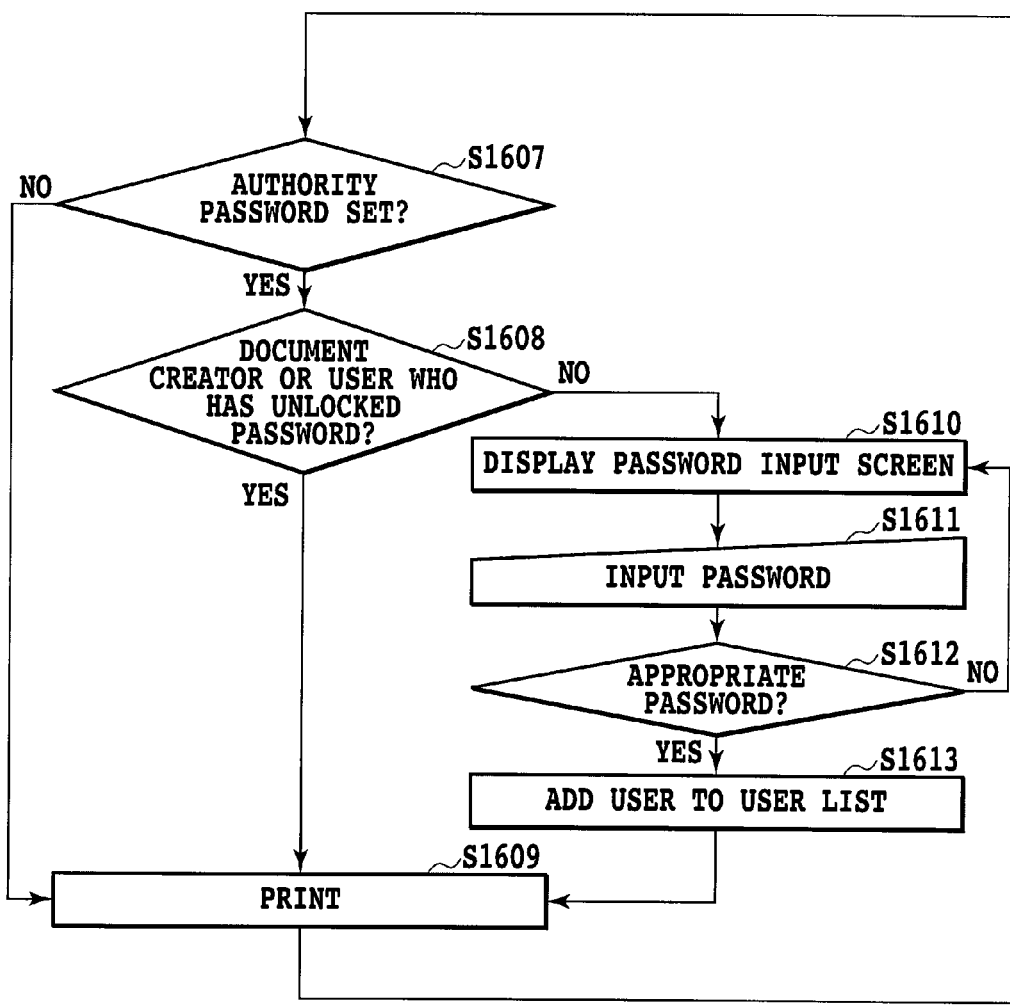
Figure 16B:
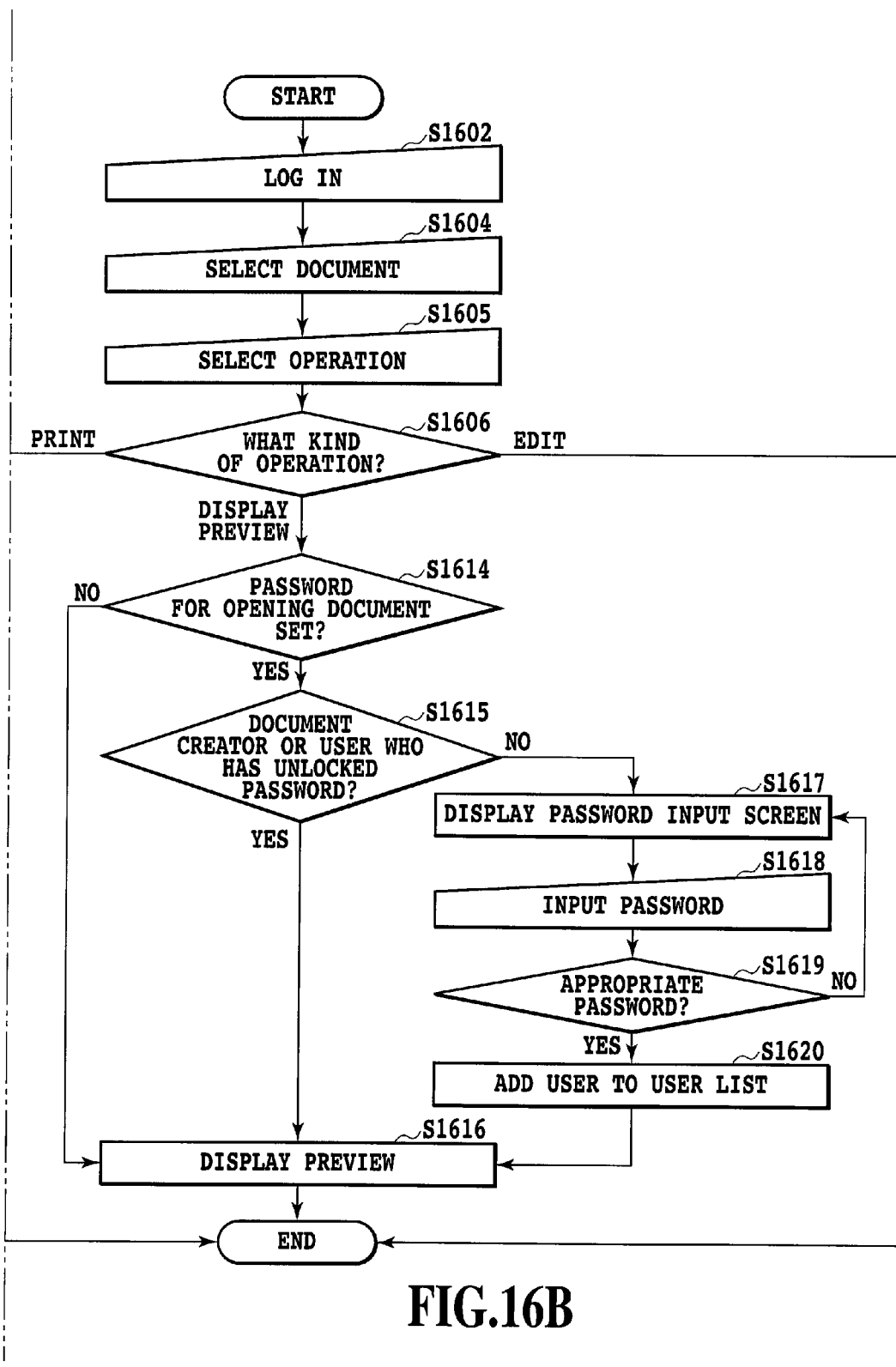
FIG. 16B is a flowchart showing an example of operation for the print data saved in the image forming apparatus 111.
Figure 16C:
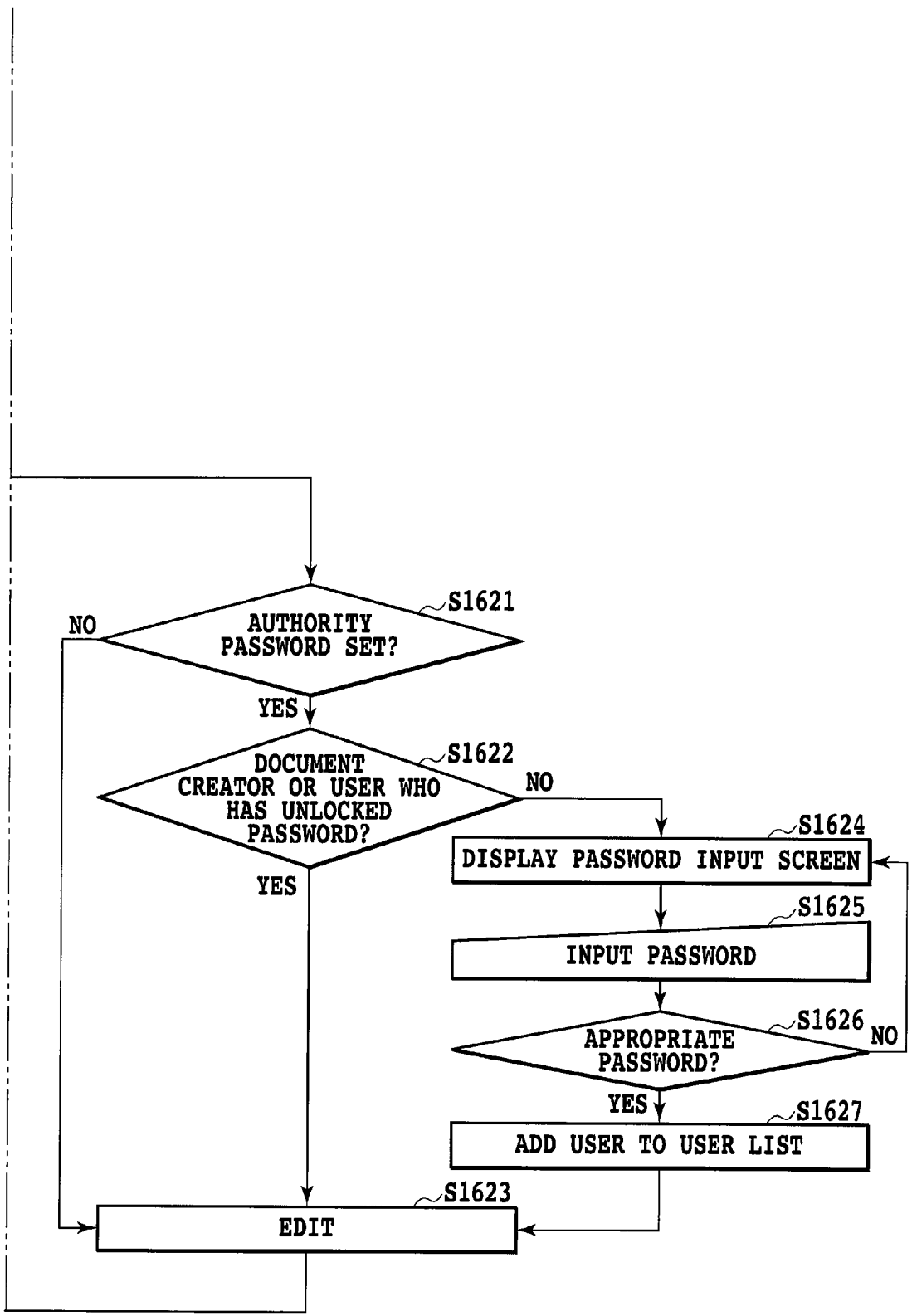
FIG. 16C is a flowchart showing an example of operation for the print data saved in the image forming apparatus 111.

FIG. 16A-FIG. 16C is a flowchart showing an example of the operating processes (S1005 to S1007) for the print data saved in the image forming apparatus 111.

In S1602, the login user inputs the user ID and the password by using the user authentication screen 700 in order to log into the image forming apparatus 111. The main control unit 408 of the image forming apparatus 111 is configured to refer to the inputted user ID at arbitrary timing.

When the login user logs in successfully, the login user selects the print data to be processed from the printing job display area 801 displayed on the saved job tab page 800 in S1604.

In S1605, the login user selects the operation for the print data to be processed. Specifically, the login user presses one of the print button 802, the preview display button 803, the edit button 804, and the delete button 805.

In S1606, the image forming apparatus 111 determines the selected operation based on the pressed button.

The image forming apparatus 111 proceeds to the process in S1607 when the printing operation is selected, proceeds to the process in S1614 when the preview displaying operation is selected and proceeds to the process in S1621 when the editing operation is selected.

First, the process when the printing operation is selected will be described below.

When the printing operation is selected, in S1607, the image forming apparatus 111 determines whether or not the "authority password" is set in the document information 1400 of the print data. When the "authority password" is not set therein, the image forming apparatus 111 prints out the print data in S1609 and terminates the process. On the other hand, when the "authority password" is set therein, the image forming apparatus 111 proceeds to the process in S1608.

In S1608, the image forming apparatus 111 determines whether or not the user ID inputted in S1602 matches either the user ID 1401 of the document creator or the user ID 1408 of the user who has unlocked the "authority password," the user IDs 1401 and 1408 set in the document information 1400 (FIG. 14). Specifically, the image forming apparatus 111 determines whether or not the user logged in the image forming apparatus 111 is the document creator or the user who has unlocked the "authority password."

If the user logged in the image forming apparatus 111 is the document creator or the user who has unlocked the "authority password," the image forming apparatus 111 prints out the print data in S1609 and terminates the process. On the other hand, when the user logged in the image forming apparatus 111 is neither the document creator nor the user who has unlocked the "authority password," the image forming apparatus 111 proceeds to the process in S1610.

In S1610 and S1611, the image forming apparatus 111 displays a password input screen and requests the login user to input the "authority password."

In S1612, the image forming apparatus 111 determines whether or not the password inputted by the login user matches the "authority password" 1406 set in the document information 1400. When the passwords do not match each other, the image forming apparatus 111 returns to the process in S1610, and urges the login user to input the "authority password" again. On the other hand, when the passwords match each other, the image forming apparatus 111 proceeds to the process in S1613.

In S1613, the image forming apparatus 111 adds the user ID inputted in S1602 to the document information 1400 as the user ID of the user who has unlocked the "authority password." Then, the image forming apparatus 111 prints out the print data in S1609 and terminates the process.

Next, the process when the preview displaying operation is selected will be described below.

When the preview displaying operation is selected in S1605, the image forming apparatus 111 determines whether or not the "password for opening a document" is set in the document information 1400 of the print data in S1614. When the "password for opening a document" is not set therein, the image forming apparatus 111 displays a preview in S1616 and terminates the process. On the other hand, when the "password for opening a document" is set therein, the image forming apparatus 111 proceeds to the process in S1615.

In S1615, the image forming apparatus 111 determines whether or not the user ID inputted in S1602 matches any one of the user ID 1401 of the document creator and the user IDs 1404 and 1405 of the users who have unlocked the "password for opening a document," the user IDs 1401, 1404 and 1405 set in the document information 1400. Specifically, the image forming apparatus 111 determines whether or not the user logged in the image forming apparatus 111 is the document creator or the user who has unlocked the "password for opening a document."

If the user logged in the image forming apparatus 111 is the document creator or the user who has unlocked the "password for opening a document," the image forming apparatus 111 displays the preview of the print data in S1616 and terminates the process. On the other hand, when the user logged in the image forming apparatus 111 is neither the document creator nor the user who has unlocked the "password for opening a document," the image forming apparatus 111 proceeds to the process in S1617.

In S1617 and S1618, the image forming apparatus 111 displays the password input screen, and requests the login user to input the "password for opening a document."

In S1619, the image forming apparatus 111 determines whether or not the password inputted by the login user matches the "password for opening a document" 1402 set in the document information 1400. When the passwords do not match each other, the image forming apparatus 111 returns to the process in S1617, and urges the login user to input the "password for opening a document" again. On the other hand, when the passwords match each other, the image forming apparatus 111 proceeds to the process in S1620.

In S1620, the image forming apparatus 111 adds the user ID inputted in S1602 to the document information 1400 as the user ID of the user who has unlocked the "password for opening a document." Then, the image forming apparatus 111 displays the preview of the print data in S1616 and terminates the process.

Next, the process when the editing operation is selected will be described below.

When the editing operation is selected in S1605, the image forming apparatus 111 determines whether or not the "authority password" is set in the document information 1400 of the print data in S1621. When the "authority password" is not set therein, the image forming apparatus 111 performs the editing operation in S1623 and terminates the process. On the other hand, when the "authority password" is set therein, the image forming apparatus 111 proceeds to the process in S1622.

In S1622, the image forming apparatus 111 determines whether or not the user ID inputted in S1602 matches either the user ID 1401 of the document creator set in the document information 1400 or the user ID 1408 of the user who has unlocked the "authority password." Specifically, the image forming apparatus 111 determines whether or not the user logged in the image forming apparatus 111 is the document creator or the user who has unlocked the "authority password."

If the user logged in the image forming apparatus 111 is the document creator or the user who has unlocked the "authority password," the image forming apparatus 111 edits the print data in S1623 and terminates the process. On the other hand, when the user logged in the image forming apparatus 111 is neither the document creator nor the user who has unlocked the "authority password," the image forming apparatus 111 proceeds to the process in S1624.

In S1624 and S1625, the image forming apparatus 111 displays the password input screen, and requests the login user to input the "authority password."

In S1626, the image forming apparatus 111 determines whether or not the password inputted by the login user matches the "authority password" 1406 set in the document information 1400. When the passwords do not match each other, the image forming apparatus 111 returns to the process in S1624, and urges the login user to input the "authority password" again. On the other hand, when the passwords match each other, the image forming apparatus 111 proceeds to the process in S1627.

In S1627, the image forming apparatus 111 adds the user ID inputted in S1602 to the document information 1400 as the user ID of the user who has unlocked the "authority password." Then, the image forming apparatus 111 edits the print data in S1623 and terminates the process.

The editing operation of the print data also includes an operation to change any of the passwords. Now, a password changing operation will be described below.

Figure 17:
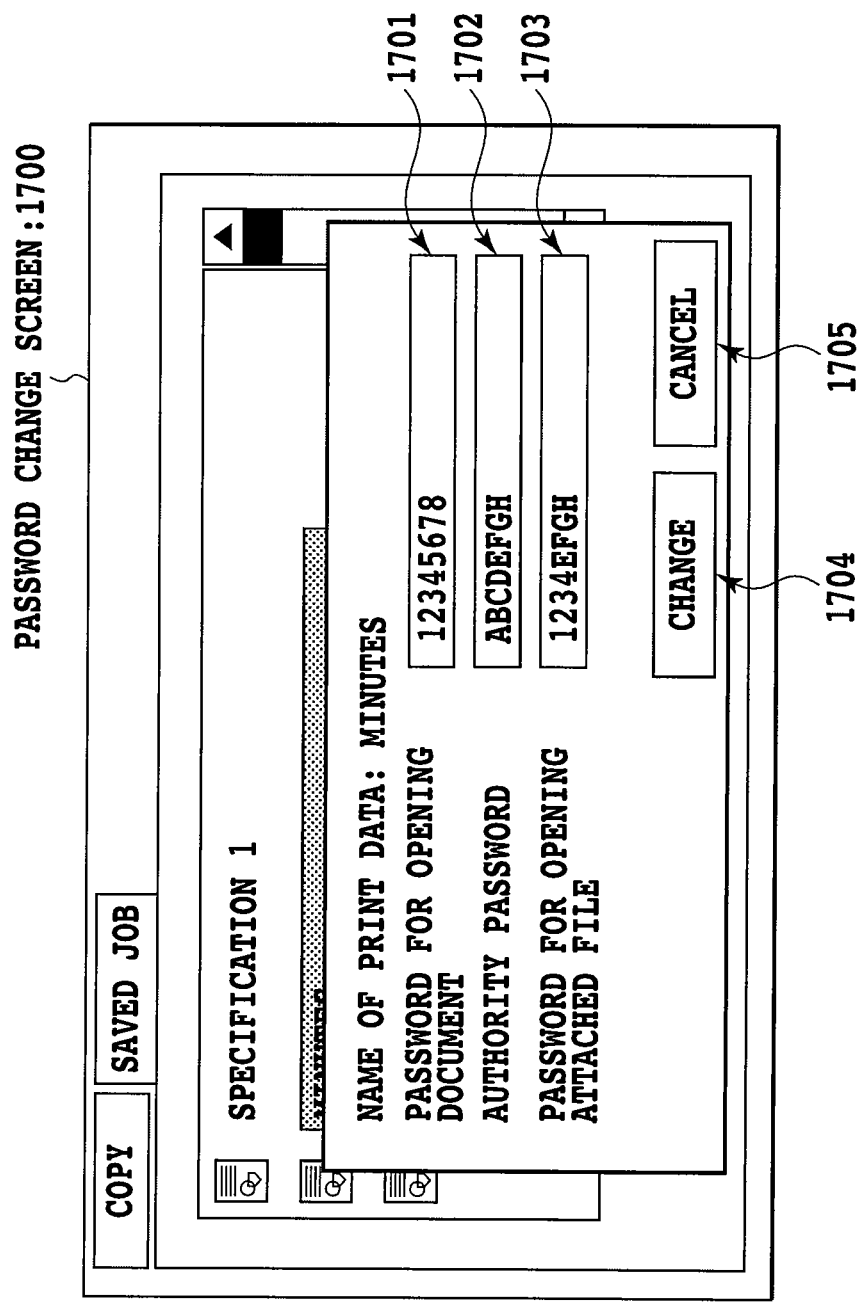
FIG. 17 is a view showing an example of a password change screen to be displayed on the touch panel unit 601.

FIG. 17 is a view showing an example of a password change screen to be displayed on the touch panel unit 601.

A password change screen 1700 includes a "password for opening a document" editing area 1701, an "authority password" editing area 1702, a "password for opening an attached file" editing area 1703, a change button 1704, and a cancel button 1705.

First, the login user inputs, in any of the password editing regions 1701 to 1703, a password to be changed to, and presses the change button 1704. Thereby, the main control unit 408 edits the document information 1400 included in the document information (x5) of the print data.

For example, when the "password for opening a document" is changed, the number of users who have unlocked the password 1403 set in the document information 1400 is initialized to 0, and the user ID (1404) of the user 1 and the user ID (1405) of the user 2 are deleted. Meanwhile, when the "authority password" is changed, the number of users who have unlocked the password 1407 set in the document information 1400 is initialized to 0, and the user ID (1408) of the user 1 is deleted. Further, when the "password for opening an attached file" is changed, the number of users who have unlocked the password 1410 set in the document information 1400 is initialized to 0. In the example shown in FIG. 14, the number of users who have unlocked the "password for opening the attached file" 1410 is set to 0 from the beginning. Therefore, an initialization process and other processes are not carried out in this case.

As described above, in this embodiment, when the image forming apparatus 111 converts the document data received from the PC 101 into the print data, the document creator set in the document data and the document operation passwords are set in the print data as the document information. Therefore, the document creator can perform printing, preview displaying, and editing without inputting the document operation passwords, thus improving convenience. Moreover, in this embodiment, the user ID of the user who has ever accessed the print data is set in document information as the user ID of the user who has unlocked the password. Therefore, even when the user is not the document creator, the user can access the print data without inputting the same document operation password if the user has ever unlocked the document operation password. Accordingly, the user can access the print data efficiently.

The passwords used in this embodiment are the "password for opening a document," the "authority password," and the "password for opening an attached file." However, it is also possible to use other types of passwords.

Other Embodiments

The present invention is applicable to a system including multiple devices (such as a system including a host computer, an interface device, a reader, a printer, and the like) and also to an apparatus made of a single device (such as a copier or a facsimile machine).

A processing method in which a program to achieve the functions of the above-described embodiment is stored in a computer-readable storage medium, and causing a computer to execute the program by reading the program stored in the storage medium as codes is also included in the above-described embodiment. Moreover, the above-described embodiment includes not only the storage medium that stores the program but also the program itself.

The storage medium may be a Floppy (registered trademark) disk, a hard disk, an optical disk, a magneto-optical disk, a CD-ROM, a magnetic tape, a non-volatile memory card, or a read-only memory (ROM), for example.

Moreover, the above-described embodiment also includes not only the configuration in which the program stored in the aforementioned storage medium executes the processes solely but also a configuration in which the program operates on operating software (OS) together with other software and functions of expansion boards in order to execute the operations as described in the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-116009, filed Apr. 25, 2008, which is hereby incorporated by reference herein in its entirety.

What is claimed is:

1. An image forming apparatus comprising:
a receiving unit that receives document data having an operation password set therein;
a conversion unit that converts the document data into print data;
a generation unit that generates document information including the operation password, and sets the generated document information in the print data, wherein the document information further includes user identification information of users who have already unlocked the operation password;
a storage unit that stores the print data having the document information set therein; and
a determining unit that determines whether or not to authorize a login user to perform an operation on the print data stored in said storage unit based on the document information set in the print data,
wherein said determining unit authorizes the login user to perform an operation on the print data stored in said storage unit without a new input of the operation password when user identification information of the login user matches the user identification information of users who have already unlocked the operation password included in the document information,
wherein, when the user identification information of the login user does not match the user identification information of users who have already unlocked the operation password included in the document information, said determining unit requests the login user to input the operation password, and
wherein, when the login user can unlock the operation password in response to the request, said determining unit authorizes the login user to perform an operation on the stored print data and adds the user identification information of the login user as the user identification information of users who have already unlocked the operation password to the document information set in the stored print data.

2. The image forming apparatus according to claim 1, wherein said determining unit deletes the user identification information of users who have already unlocked the operation password included in the document information from the document information when the operation password included in the document information is changed.

3. The image forming apparatus according to claim 1, wherein a creator of the document data is included in the document information as a user who is authorized to perform the operation on the print data.

4. The image forming apparatus according to claim 1, wherein the operation includes at least one of an operation to display a preview of the print data, an operation to print the print data, and an operation to edit the print data.

5. A method of user authentication comprising the steps of:
receiving document data having an operation password set therein;
converting the received document data into print data;
generating document information including the operation password;
setting the generated document information in the print data;
storing the print data in which the document information is set, wherein the document information further includes user identification information of users who have already unlocked the operation password; and
determining whether or not to authorize a login user to perform an operation on the stored print data based on the document information set in the print data,
wherein, in said determining step, the login user is authorized to perform an operation on the stored print data without a new input of the operation password when user identification information of the login user matches user identification information of users who have already unlocked the operation password included in the document information,
wherein, when the user identification information of the login user does not match the user identification information of users who have already unlocked the operation password included in the document information, the login user is requested to input the operation password in said determining step, and
wherein, when the login user can unlock the operation password in response to the request, in said determining step, the login user is authorized to perform an operation on the stored print data, and the user identification information of the login user is added as the user identification information of users who have already unlocked the operation password to the document information set in the stored print data.

6. The method of user authentication according to claim 5, wherein, in said determining step, the user identification information of users who have already unlocked the operation password is deleted from the document information when the operation password included in the document information is changed.

7. The method of user authentication according to claim 5, wherein a creator of the document data is included in the document information as a user who is authorized to perform the operation on the print data.

8. The method of user authentication according to claim 5, wherein the operation includes at least one of an operation to display a preview of the print data, an operation to print the print data, and an operation to edit the print data.

9. A non-transitory computer-readable storage medium storing a program for causing a computer to execute the following steps of:
   receiving document data having an operation password set therein;
   converting the received document data into print data;
   generating document information including the operation password;
   setting the generated document information in the print data;
   storing the print data in which the document information is set, wherein the document information further includes user identification information of users who have already unlocked the operation password; and
   determining whether or not to authorize a login user to perform an operation on the stored print data based on the document information set in the print data,
   wherein, in said determining step, the login user is authorized to perform an operation on the stored print data without a new input of the operation password when user identification information of the login user matches user identification information of users who have already unlocked the operation included in the document information,
   wherein, when the user identification information of the login user does not match the user identification information of users who have already unlocked the operation password included in the document information, the login user is requested to input the operation password in said determining step, and
   wherein, when the login user can unlock the operation password in response to the request, in said determining step, the login user is authorized to perform an operation on the stored print data, and the user identification information of the login user is added as the user identification information of users who have already unlocked the operation password to the document information set in the stored print data.

\* \* \* \* \*